(12) United States Patent
Hantler et al.

(10) Patent No.: US 9,552,349 B2
(45) Date of Patent: Jan. 24, 2017

(54) METHODS AND APPARATUS FOR PERFORMING SPELLING CORRECTIONS USING ONE OR MORE VARIANT HASH TABLES

(75) Inventors: Sidney L. Hantler, Cortlandt Manor, NY (US); Meir M. Laker, Spring Valley, NY (US); Jonathan Lenchner, North Salem, NY (US); Daniel Milch, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 2690 days.

(21) Appl. No.: 11/513,782

(22) Filed: Aug. 31, 2006

(65) Prior Publication Data
US 2008/0059876 A1    Mar. 6, 2008

(51) Int. Cl.
*G06F 17/00* (2006.01)
*G06F 17/27* (2006.01)

(52) U.S. Cl.
CPC .......... *G06F 17/273* (2013.01); *G06F 17/276* (2013.01); *G06F 17/2735* (2013.01)

(58) Field of Classification Search
CPC ... G06F 17/273; G06F 17/276; G06F 17/2735
USPC ......................................... 715/256, 257, 259
See application file for complete search history.

(56) References Cited

U.S. PATENT DOCUMENTS

| | | | | |
|---|---|---|---|---|
| 5,204,966 A | * | 4/1993 | Wittenberg et al. | 726/6 |
| 5,297,038 A | * | 3/1994 | Saito | 707/1 |
| 5,303,150 A | * | 4/1994 | Kameda | G06F 17/276 704/9 |
| 5,655,129 A | * | 8/1997 | Ito | G06F 17/30625 704/10 |
| 5,819,265 A | * | 10/1998 | Ravin et al. | 707/5 |
| 6,032,164 A | * | 2/2000 | Tsai | G06F 17/273 434/167 |
| 6,208,965 B1 | * | 3/2001 | Brown et al. | 704/246 |
| 6,616,704 B1 | | 9/2003 | Birman et al. | |

(Continued)

OTHER PUBLICATIONS

Sennhauser, Improving the recognition accuracy of text recognition systems using typographical constraints, Sep. 1993, Electronic Publishing, vol. 6(3), pp. 273-282.*

(Continued)

*Primary Examiner* — William Bashore
*Assistant Examiner* — David Faber
(74) *Attorney, Agent, or Firm* — Ryan, Mason & Lewis, LLP

(57) ABSTRACT

Methods and apparatus are provided for performing spelling corrections using one or more variant hash tables. The spelling of at least one candidate word is corrected by obtaining at least one variant dictionary hash table based on variants of a set of known correctly spelled words, wherein the variants are obtained by applying one or more of a deletion, insertion, replacement, and transposition operation on the correctly spelled words; obtaining from the candidate word one or more lookup variants using one or more of the deletion, insertion, replacement, and transposition operations; evaluating one or more of the candidate word and the lookup variants against the at least one variant dictionary hash table; and indicating a candidate correction if there is at least one match in the at least one variant dictionary hash table.

24 Claims, 5 Drawing Sheets

(56) References Cited

U.S. PATENT DOCUMENTS

| | | | | |
|---|---|---|---|---|
| 6,618,697 | B1* | 9/2003 | Kantrowitz | G06F 17/273 703/2 |
| 6,717,946 | B1* | 4/2004 | Hariguchi | G06F 17/30985 370/389 |
| 6,889,361 | B1* | 5/2005 | Bates | G09B 19/04 715/257 |
| 7,120,582 | B1* | 10/2006 | Young | G10L 15/063 704/243 |
| 7,254,774 | B2* | 8/2007 | Cucerzan et al. | 715/257 |
| 7,277,088 | B2* | 10/2007 | Robinson | G06F 3/0219 345/173 |
| 7,366,983 | B2* | 4/2008 | Brill et al. | 715/257 |
| 7,451,075 | B2* | 11/2008 | Mohammed | G06F 17/273 704/10 |
| 7,549,119 | B2* | 6/2009 | McCaffrey | G06F 17/2294 715/234 |
| 7,880,730 | B2* | 2/2011 | Robinson | G06F 3/0219 345/172 |
| 2002/0003547 | A1* | 1/2002 | Wang et al. | 345/727 |
| 2002/0123882 | A1* | 9/2002 | Mohammed | G06F 17/273 704/10 |
| 2002/0194229 | A1* | 12/2002 | Decime et al. | 707/533 |
| 2003/0074186 | A1* | 4/2003 | Wang | G06F 17/2785 704/4 |
| 2004/0086179 | A1* | 5/2004 | Ma | G06K 9/723 382/177 |
| 2004/0205672 | A1* | 10/2004 | Bates et al. | 715/533 |
| 2005/0174333 | A1* | 8/2005 | Robinson | G06F 3/0219 345/168 |
| 2005/0210383 | A1* | 9/2005 | Cucerzan et al. | 715/533 |
| 2005/0289463 | A1* | 12/2005 | Wu et al. | 715/533 |
| 2006/0167676 | A1* | 7/2006 | Plumb | G06F 17/273 704/6 |
| 2006/0241944 | A1* | 10/2006 | Potter | G06F 17/2795 704/254 |
| 2007/0168469 | A1* | 7/2007 | Church | G06F 17/273 709/219 |
| 2008/0059876 | A1* | 3/2008 | Hantler | G06F 17/273 715/257 |
| 2008/0100579 | A1* | 5/2008 | Robinson | G06F 3/0219 345/168 |

OTHER PUBLICATIONS

Figueroa, A Study of Spelling Errors in Word Processing: Detection and Correction, Jun. 2006, University of Puerto Rico, pp. 1-60.*
University of Stanford, "CS276A Information Retrieval: Lecture 4", Uni. of Stanford, 8 pages + 1 Page showing pdf was created on Sep. 30, 2004, + 1 page showing pdf was published/on Google since Oct. 14, 2004 (10 pages total).*
Macaulay2, "hash tables", 3 pages + 1 page showing pdf was published/on Google since Feb. 1, 2001 (4 pages total).*
Crochemore et al. "Text Algorithms," Oxford University Press, New York (1994).
Green et al., "Multi-Index Hashing for Information Retrieval," 35th Annual Symposium on Foundations of Computer Science pp. 722-731 (1994).

* cited by examiner

METHODS AND APPARATUS FOR PERFORMING SPELLING CORRECTIONS USING ONE OR MORE VARIANT HASH TABLES

FIELD OF THE INVENTION

The present invention relates generally to techniques for real-time spelling correction of a term against a dictionary of valid words and more particularly, to techniques for real-time spelling correction of a term using one or more hash tables.

BACKGROUND OF THE INVENTION

A number of techniques exist for automatically detecting and correcting spelling errors. Suppose that a spell checking algorithm is given a word, G, and attempts to find one or more other words from a list of candidate words (such as validly spelled words) that are within a given edit distance from G. The edit distance between two words is the smallest number of operations that transform the candidate word into the given word (with each operation consisting of removing one letter (deletion), adding one letter (insertion), replacing one letter with another letter (replacement), or transposing two letters (transposition)).

Two words are said to have a distance (or "edit distance") of zero between them if they are identical. The two words are said have a distance one separation if one can get from one word to the other word, by: (1) transposing one pair of adjacent characters; (2) replacing a single character with any other character; (3) deleting any one character; or (4) inserting an arbitrary character at any position in the original word. Likewise, words are a distance two apart if two moves of the type described above are required to get from the first word to the second word. More generally, two words are a distance N apart if N moves are required to get from the first word to the second.

U.S. Pat. No. 6,616,704 B1, assigned to the assignee of the present invention and entitled "Two Step Method for Correcting Spelling of a Word or Phrase in a Document," discloses a method for correcting the spelling of a word or phrase in a document. The disclosed method proceeds in two steps: first an initial approximate method eliminates most candidate words from consideration (without computing the exact edit distance between the given word whose spelling is to be corrected and any candidate word), and then a "slow method" computes the exact edit distance between the word whose spelling is to be corrected and each of the few remaining candidate words. For a dictionary of size D and a maximum word length W, the disclosed two step method is said to run in time on the order of (D), if the number of exact edit distance calculations is small, and on the order of $(D*W^2)$ otherwise.

While such existing techniques for real-time spelling correction of a term against a dictionary of valid words provide an effective mechanism for detecting and correcting spelling errors, they suffer from a number of limitations, which if overcome, could further improve the efficiency, utility and reliability of spell checking functions. More particularly, a number of existing techniques generate an excessive amount of false positives. In addition, for the detection of certain errors, existing techniques are said to run in time on the order of the dictionary size, D, or on the order of log(D), the log of the size of the dictionary.

A need therefore exists for improved techniques for real-time spelling correction of a term against a dictionary of valid words.

SUMMARY OF THE INVENTION

Generally, methods and apparatus are provided for performing spelling corrections using one or more variant hash tables. According to one aspect of the invention, the spelling of at least one candidate word is corrected by obtaining at least one variant dictionary hash table based on variants of a set of known correctly spelled words, wherein the variants are obtained by applying one or more of a deletion, insertion, replacement, and transposition operation on the correctly spelled words; obtaining from the candidate word one or more lookup variants using one or more of the deletion, insertion, replacement, and transposition operations; evaluating one or more of the candidate word and the lookup variants against the at least one variant dictionary hash table; and indicating a candidate correction if there is at least one match in the at least one variant dictionary hash table.

In an exemplary "distance one" implementation, a dictionary hash table is also employed, where the dictionary hash table and the at least one variant dictionary hash table are based on a dictionary of correctly spelled words and are comprised of at least one distance one variation for each dictionary entry, wherein the distance one variation comprises one or more of a deletion, insertion, replacement, and transposition operation performed on the entries. The step of evaluating one or more of the candidate word and the lookup variants against the at least one variant dictionary hash table further comprises the step of evaluating one or more distance one variants against the at least one variant dictionary hash table.

A more complete understanding of the present invention, as well as further features and advantages of the present invention, will be obtained by reference to the following detailed description and drawings.

DETAILED DESCRIPTION OF PREFERRED EMBODIMENTS

The present invention provides improved techniques for real-time spelling correction of a term against a dictionary of valid words (including all word forms). The dictionary can be multi-lingual, i.e., it can be composed of multiple single language dictionaries. It can also be comprised of such things as sequences of nucleotides in biology, or any collection of valid "words" consisting of letters from a pre-established "alphabet." While the dictionary size and alphabet size are presumed to be large, their actual size is unimportant, and average/maximum word length is assumed to be relatively small, i.e., many orders of magnitude smaller than the dictionary size.

For a dictionary size, D, alphabet size, A, and a maximum word length, W, the disclosed algorithm corrects distance one misspellings in $O(W)$ time and distance two misspellings in $O(W^2)$ time. The required storage is $O(D)$, or in the case W varies with D, equal to $O(D*W)$, for distance one misspellings and $O(D*W^2)$ for distance two misspellings. In general, it is assumed that W is more or less constant and does not grow with D so that $O(D)$ equals $O(D*W)$ or $O(D*W^2)$.

According to a further aspect of the invention a soft algorithm is disclosed that uses a "soft" definition of distance two misspellings, where distance two spelling correction can be performed in $O(W)$ time and $O(D)=O(D*W)$ storage. "Soft" distance two means that only the following distance two errors are considered: double transposition, transposition-deletion, transposition-insertion, deletion-transposition, deletion-insertion, insertion-transposition, and insertion-deletion.

Figure 1:
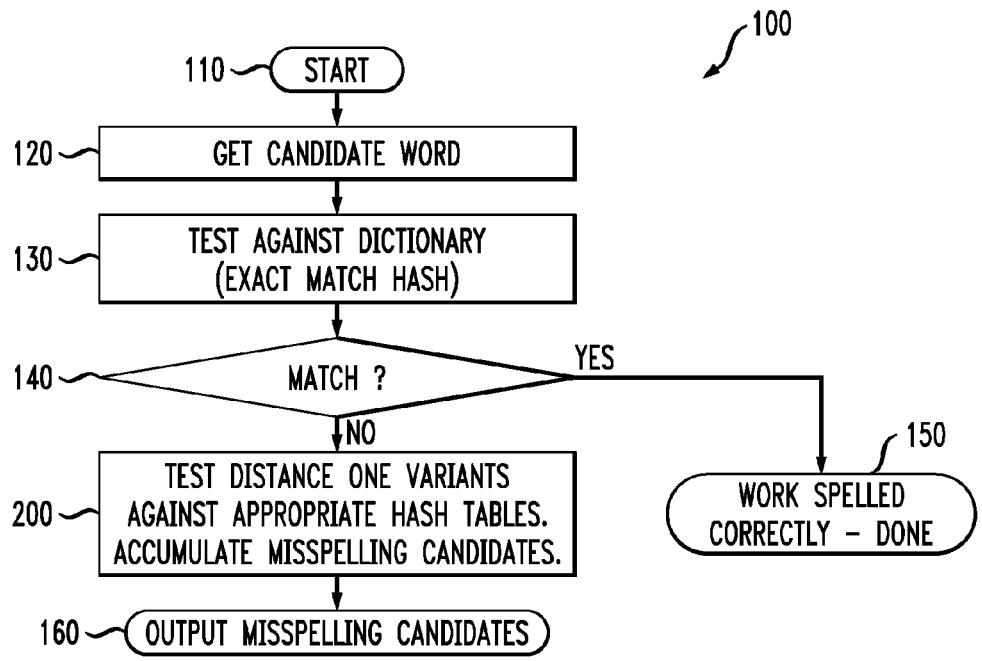
FIG. 1 is a flow chart illustrating the overall flow of an exemplary distance one spelling correction algorithm.

FIG. 1 is a flow chart illustrating the overall flow of an exemplary distance one spelling correction algorithm 100. In some instances of the spelling correction problem, it is adequate to detect only distance one spelling errors, and furthermore, distance one detection is the first step in the various distance two correction algorithms. A wild card is an arbitrary symbol, indicating a wildcard that is assumed to not appear in any dictionary word.

In the following discussion, the verb "to hash" or any of its grammatical variants refer to the act of placing something in a hash table. For example, the phrase "hashing all dictionary words" means placing all dictionary words in a hash table. Uses of hashtables and performance guarantees for simple hash table operations such as insertion and lookup are described in any standard reference on algorithms. See, for example, C. Cormen et al., *Introduction to Algorithms*, MIT Press (2001).

The method involves hashing all dictionary words, in a known manner, and all "replacements" of dictionary words, in accordance with the present invention. Replacements are hashed, using, for example, an asterisk '*' as a wild card, as follows. If the dictionary word is COAT, then the following variants are hashed: *OAT, C*AT, CO*T and COA*. In general, if a word is of length W, then W such word variants are hashed. The (key, value) pairs are (*OAT, COAT), (C*AT, COAT), (CO*T, COAT), and (COA*, COAT). Separate hash tables are kept for the words (i.e., the dictionary) and for the replacement variants. These hash tables are assumed to be pre-created prior to when the distance one spelling corrector starts up (Step 110).

In response to obtaining the input candidate word (Step 120), say in this case the term is WXYZ, one first checks the word against the direct dictionary hash (Step 130). One then gets to the decision point 140. If a match is found in the dictionary hash, then the word is spelled correctly, and the program terminates indicating the correct spelling, as in Step 150. If, however, no match is found, a misspelling is assumed and one checks all distance one variants against the appropriate distance one hash tables, accumulating suggested spelling corrections using the process 200, discussed further below in conjunction with FIG. 2. Finally, in Step 160 the suggested corrections are output.

Figure 2:
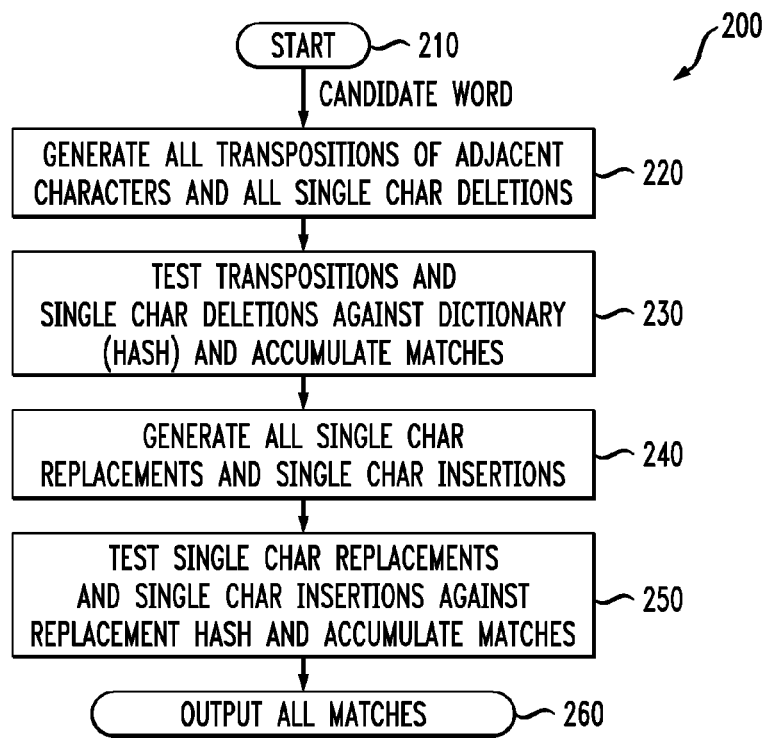
FIG. 2 is a flow chart illustrating an exemplary process of testing variants of the candidate word against hash tables derived from the dictionary for distance one misspellings in accordance with the present invention.

FIG. 2 is a flow chart illustrating an exemplary process 200 of testing variants of the candidate word against hash tables derived from the dictionary for distance one misspellings in accordance with the present invention. Upon starting and obtaining the candidate word (Step 210), one first generates all transpositions of adjacent characters, and single character deletions of the candidate word (Step 220). For the candidate word WXYZ, the transpositions would be XWYZ, WYXZ, and WXZY. The deletions would be XYZ, WYZ, WXZ, and WXY. These are each checked against the dictionary hash in Step 230 and any matches are accumulated. The transposition checking will undo a misspelling of the same kind since the inverse of a transposition is the same transposition and the deletion checking will undo a corresponding insertion. The next step is to generate all single character replacements and insertions (Step 240) and test these against the replacement hash (Step 250). Replacements in this case are *XYZ, W*YZ, WX*Z, and WXY*. Insertions are *WXYZ, W*XYZ, WX*YZ, WXY*Z, and WXYZ*. Replacements catch distance one replacement errors, and insertions catch distance one deletion errors. As usual, the final step is to output all hash table matches (Step 260). The total effort expended is 4W hash lookups which is $O(W)$, and the memory used for storage of the hash is $O(D)=O(D*W)$.

This algorithm affords no false positives. In other words, the algorithm never suggests a spelling correction that is more than distance one from the original word. On the other hand, if one were to just hash the dictionary together with all ordered subsequences of dictionary words of length W−1 as in Greene et al., "Multi-Index Hashing for Information Retrieval," 35th Annual Symposium on Foundations of Computer Science, 722-731 (1994), and do a corresponding lookup, one would run into false positives. For example, for both the dictionary words COAT and OATH the ordered subsequence OAT would be hashed, and both would be a suggested distance one correction in response to the query "DOAT," despite the fact that OATH is not distance one from DOAT.

Figure 3:
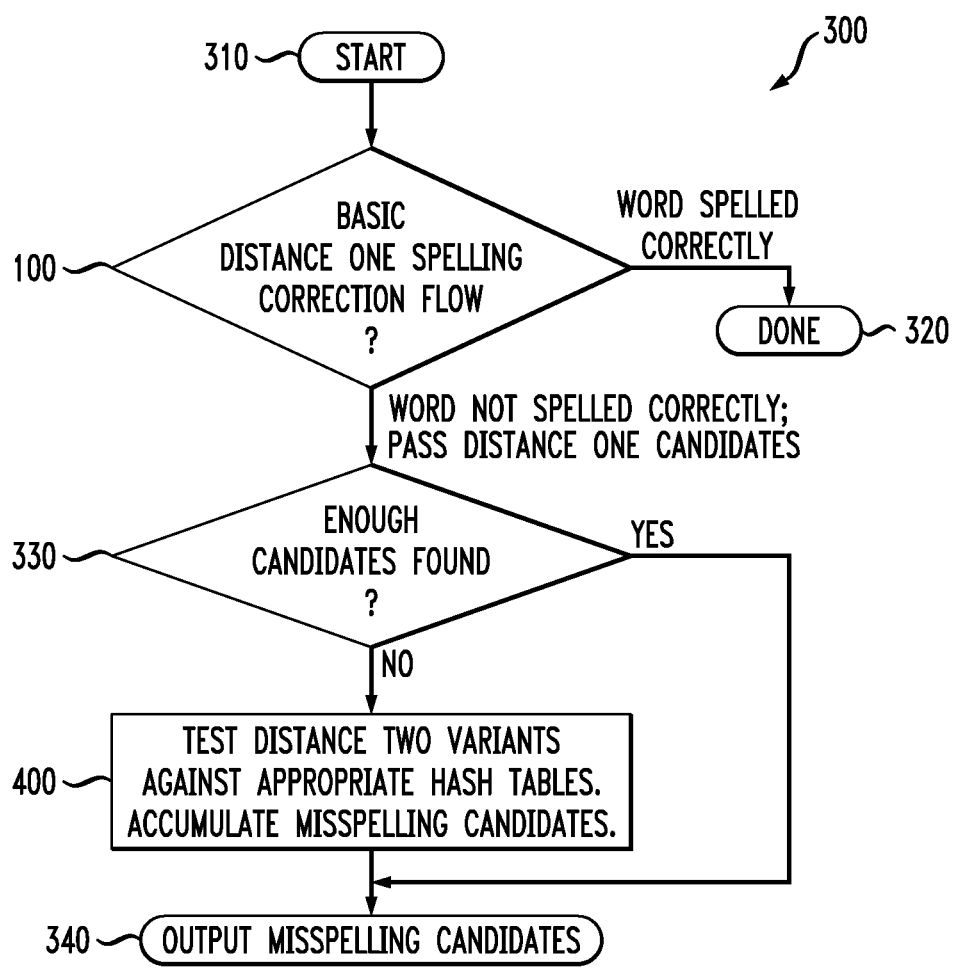
FIG. 3 is a flow chart illustrating the overall flow of the distance two spelling correction algorithm.

FIG. 3 is a flow chart illustrating the overall flow of the distance two spelling correction algorithm 300. The method 300 involves the utilization of certain hash tables that are assumed to be pre-created. The following hash tables are needed: a transposition (t) hash, a deletion (d) hash, a transposition-replacement (tr) hash, a deletion-transposition (dt) hash, a double deletion (dd) hash, a deletion-replacement (dr) hash, and an insertion-replacement (ir) hash. Only a special form of the deletion-transposition hash is required, namely, those deletions followed by transpositions that first delete a character, and then transpose the characters initially surrounding the deleted character, as discussed further below. Each of these hash tables contains keys that correspond to certain variant forms of each dictionary word. The contents of each hash are again illustrated by considering the sample dictionary word COAT. Although the contents of the hash table are (key, value) pairs, in all cases for the dictionary word COAT, value =COAT, so only the keys are shown.

Transposition (t) hash: OCAT, CAOT, COTA
Deletion (d) hash: OAT, CAT, COT, COA
Transposition-replacement (tr) hash: *CAT, O*AT, OC*T, OCA*, *AOT, C*OT, CA*T, CAO*, *OTA, C*TA, CO*A, COT*
Special deletion-transposition hash: ACT, CTO
Double deletion hash: CO, CA, CT, OA, OT, AT
Deletion-replacement hash: *AT, O*T, OA*, C*T, CA*, *OT, CO*, *OA, C*A Insertion-replacement hash: **OAT, *C*AT, *CO*T, *COA*, C**AT, C*O*T, C*OA*, *O*AT, CO**T, CO*A*, *OA*T, C*A*T, COA**, *OAT*, C*AT*, CO*T*

These hash tables require, in total $O(D*W^2)$ storage.

Referring again to FIG. 3, with the above hash tables pre-created, a test is performed for a distance one misspelling (as discussed above in conjunction with FIG. 1). As noted earlier, this takes O(W) time and requires storage that is O(D)=O(D*W). If the distance one misspelling routine indicates that the candidate word is spelled correctly, the algorithm terminates, also indicating a correct spelling (Step 320). Otherwise, it checks to see if enough suggested corrections have been accrued in testing for a distance one correction (Step 330). If enough have been detected it outputs the suggested corrections and terminates (Step 340), otherwise it goes through the process of testing distance two variants of the candidate word against the distance two hash tables (Step 400), and only then outputs suggested corrections and terminates (Step 340).

Figure 4:
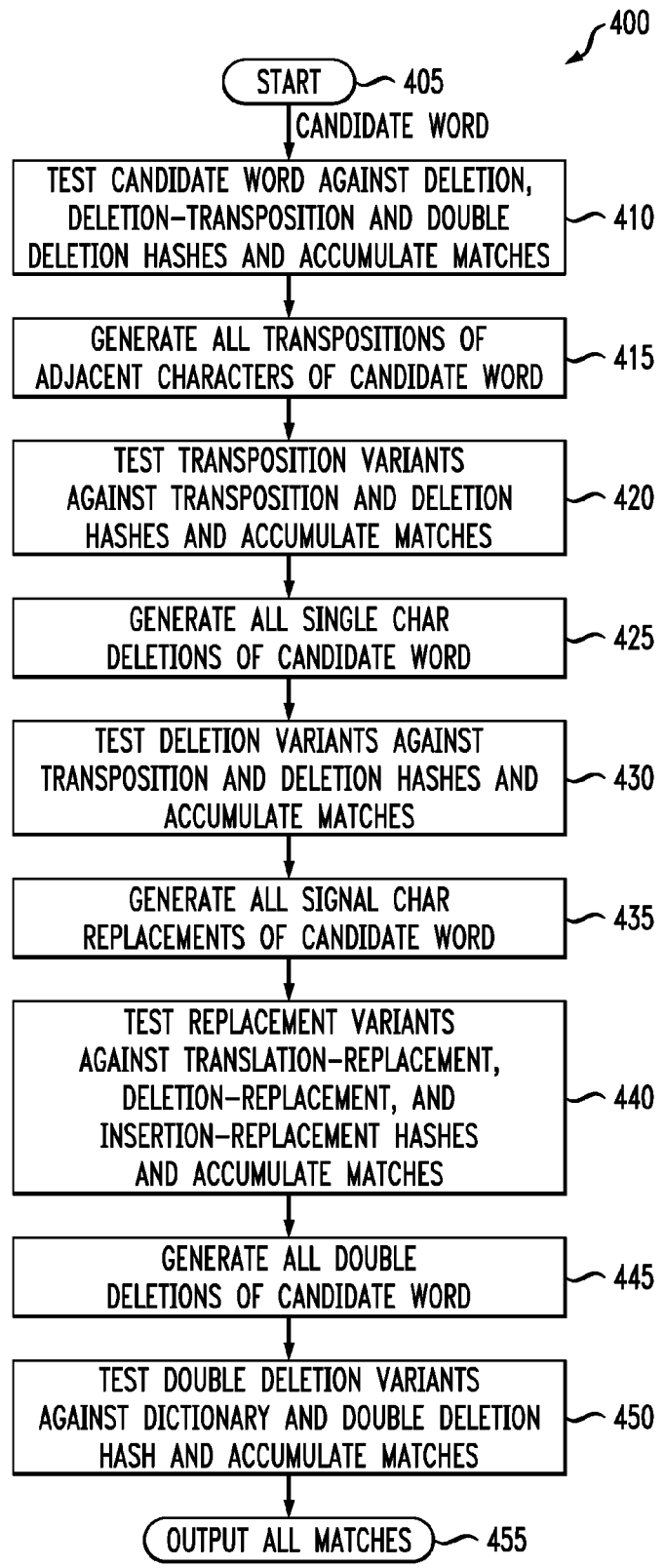
FIG. 4 is a flow chart illustrating the process of testing variants of the candidate word against hash tables derived from the dictionary for distance two misspellings.

FIG. 4 is a flow chart illustrating the process 400 of testing variants of the candidate word against hash tables derived from the dictionary for distance two misspellings. If a transposition is denoted by t, a deletion by d, an insertion by i, and a replacement by r; the following misspellings are possible: tt, td, ti, tr, dt, dd, di, dr, it, id, ii, ir, rt, rd, ri, rr.

The following table lists the misspelling type, the action, and the hash table checked for each of the 16 possible distance two misspellings. Note that the possible outcomes of two successive misspellings xy, where x,y are elements of {t,d,i,r} are the same as the successive misspellings of yx, except in the single case where td≠dt, since for example, on the one hand, starting with the word COAT one can reach CTO via a transposition followed by a deletion, but not via a deletion followed by a transposition, and on the other hand, starting from COAT one can reach OAT via a transposition followed by a deletion but not vice versa. Note that there is also an asymmetry in it and ti, where, for example (again from the word COAT), the CO*AT variant is not obtainable from ti and the ti variant CA*OT is not obtainable from it. However, the first of these variants is caught in a distance one simple insertion check, so can be disregarded, and the second variant is caught just like all other it or ti variants by the d Test Action against the t hash table. Only in the two cases, of td and dt are two separate actions followed by hash table checks required. The dt hash is a special hash since it does not need to store all deletions followed by transpositions, since most of these will be caught by the t test action against the d hash table. The exceptional cases are those where one first deletes a character and then transposes the characters that were originally around the deleted character. Only these O(W) deletion-transpositions need to be stored in the dt hash table.

TABLE 1

| Misspelling Type | Test Action | Hash table checked |
|---|---|---|
| tt | t | t |
| td | t | d |
|  | (none) | d |
| ti | d | t |
| tr | r | tr |
| dt | t | d |
|  | (none) | dt |
| dd | (none) | dd |
| di | d | d |
| dr | r | dr |
| it | d | t |
| id | d | d |
| ii | dd | dictionary |
| ir | r | ir |
| rt | r | tr |
| rd | r | dr |
| ri | r | ir |
| rr | dd | dd |

Returning to FIG. 4, after starting (Step 405) and obtaining the candidate word, one tests the candidate word against the deletion, deletion-transposition and double deletion hash tables, and accumulates matches in Step 410, as verified by checking Table 1. Next, one generates all single move transpositions of the candidate word in Step 415 and tests these variants against the transposition and deletion hashes in Step 420. Next, in Step 425 one generates all single character deletion variants and in Step 430 tests these against the transposition and deletion hashes. Note that just the various test actions that go against the same hash tables in Table 1 are accumulated and being executed in a single step, for the sake of brevity of explanation. Next, in Step 435 one generates all single character replacement variants of the candidate word and in Step 440 tests against the translation-replacement, deletion-replacement, and insertion-replacement hash tables. Finally, in Step 445 all double deletions of the candidate word are generated and in Step 450 these are tested against the double deletion hash. Having accumulated all hash table matches, the results are output in Step 455.

It is noted that except for distance two misspellings that involve double insertions, double deletions, or replacements, all actions can be done in O(W) time with O(D*W)=O(D) storage. However, replacements are less usual than the other single operations, and may be considered to be a deletion followed by an insertion. Also, double insertions and double deletions are relatively rare types of misspellings. Hence, if distance two misspellings are re-defined to exclude these possibilities (i.e., don't test these cases), a correction algorithm is provided that runs in O(W) time with O(D*W)=O(D) storage. This is referred to as a "soft" distance two correction.

Figure 5:
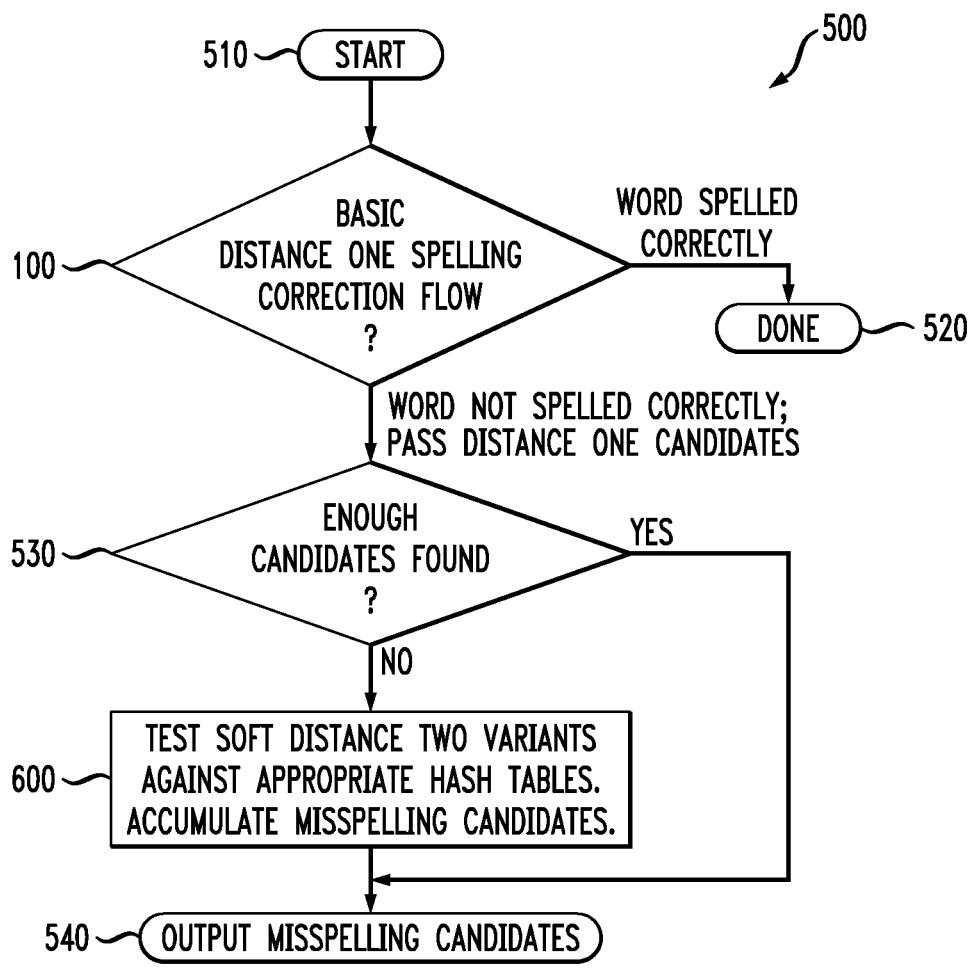
FIG. 5 is a flow chart illustrating the overall flow of the "soft" distance two spelling correction algorithm.

FIG. 5 is a flow chart illustrating the overall flow of the "soft" distance two spelling correction algorithm 500. The diagram of FIG. 5 is identical to FIG. 3, the complete distance two correction flow, except that in lieu of testing all distance two variants against the relevant distance two hash tables, only distance two variants are tested that do not include a replacement, and do not include double deletion and double replacement. As usual, relevant hash tables are assumed to be pre-created. Distance one correction is initially performed (Step 100). If no misspelling is detected, the process 500 outputs that the word is spelled correctly and terminates (Step 520). Otherwise, a test is performed to see if enough candidates are found (Step 530). If enough candidates are found, the process outputs just the distance one corrections and terminates (Step 540). Otherwise, the process 500 continues with soft distance two variant testing (Step 600), as discussed further below in conjunction with FIG. 6, and only after this testing output the results and terminate (Step 540).

Figure 6:
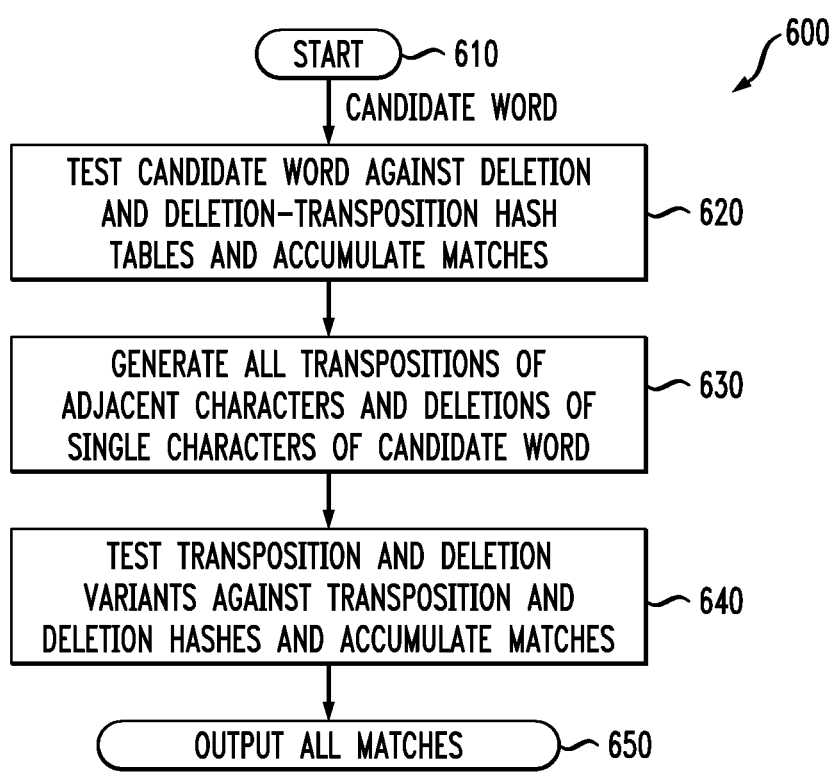
FIG. 6 describes the process of testing variants of the candidate word against hash tables derived from the dictionary for "soft" distance two misspellings.

FIG. 6 describes the process 600 of testing variants of the candidate word against hash tables derived from the dictionary for "soft" distance two misspellings. The algorithm 600 starts in block 610 and obtains the candidate word. Following that, the unchanged candidate word is tested against the deletion and deletion-transposition hash tables in Step 620. Next, all single step transpositions and single step deletions are generated (Step 630), and then tested against the single step transposition and single step deletion hash tables (Step 640). Finally, the accumulated matches are output in Step 650.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

What is claimed is:

1. A method for correcting spelling of at least one candidate word, said method comprising:

obtaining at least one variant dictionary hash table based on variants of a set of known correctly spelled words, wherein said variants are obtained by applying one or more of a deletion, insertion, replacement, and transposition operation on said correctly spelled words, wherein said variants obtained by applying one or more of an insertion and replacement operation on said correctly spelled words comprise a wildcard character, wherein for a given correctly spelled word having a length W, said at least one variant dictionary hash table comprises W of said variants each comprising said wildcard character in a different position, and wherein said variants are stored in said at least one variant dictionary hash table and are mapped to one of said corresponding correctly spelled words from said set of known correctly spelled words which are stored in a dictionary hash table that is distinct from said at least one variant dictionary hash table;

performing one or more of a deletion, insertion, replacement, and transposition operation on the at least one candidate word to obtain one or more lookup variants, wherein said lookup variants obtained by applying one or more of an insertion and replacement operation on said at least one candidate word comprise a wildcard character;

evaluating one or more of said lookup variants utilizing said at least one variant dictionary hash table to identify matches; and indicating a candidate correction if said evaluation step indicates that there is at least one match in the at least one variant dictionary hash table.

2. The method of claim 1, wherein said dictionary hash table is pre-created prior to obtaining said candidate word, further comprising the step of obtaining said dictionary hash table having entries in a dictionary of known correctly spelled words and wherein said dictionary hash table and said at least one variant dictionary hash table are based on said dictionary and are comprised of at least one distance one variation for each of said entries, wherein said distance one variation comprises one or more of a deletion, insertion, replacement, and transposition operation performed on said entries; and wherein the step of evaluating said lookup variants utilizing said at least one variant dictionary hash table further comprises the step of evaluating one or more distance one variants utilizing said at least one variant dictionary hash table.

3. The method of claim 2, wherein said distance one variation comprises a replacement operation to generate a replacement hash table having entries of single character wild card replacements of said entries in said dictionary and said method further comprises the steps of generating single character replacements and insertions of said candidate word and comparing said single character replacements and insertions against said replacement hash table.

4. The method of claim 3, wherein the replacement hash table is obtained by:

generating variants of each word in the dictionary, each variant is comprised of replacing any one character in the word with a wild card character and leaving other characters unchanged, thereby generating W variants for each word of length W; and for each generated variant of a word in the dictionary, storing a key-value pair in a hash table, wherein a key is a generated variant having a value that is the word itself.

5. The method of claim 2, further comprising the steps of generating one or more distance one variants of said at least one candidate word and testing said distance one variants against one or more of said dictionary hash table and said at least one variant dictionary hash table, and accumulating matches.

6. The method of claim 5, wherein said one or more distance one variants comprises adjacent character transpositions of said at least one candidate word obtained by generating all variants of the candidate word wherein any one pair of adjacent characters are interchanged, and the remaining characters are left unchanged.

7. The method of claim 5, wherein said one or more distance one variants comprises single character wild card replacements of said at least one candidate word obtained by generating variants of said at least one candidate word by replacing any one character in said at least one candidate word with a chosen wild card character and leaving other characters unchanged, thereby generating W variants of said at least one candidate word of length W.

8. The method of claim 5, wherein said one or more distance one variants comprises single character wild card insertions of said at least one candidate word obtained by generating variants of said at least one word which comprise inserting a wild card character before or after any character of said at least one candidate word and leaving the other characters unchanged, thereby generating W+1 variants of said at least one candidate word of length W.

9. The method of claim 2, further comprising the step of testing said at least one candidate word against a deletion hash table, a deletions-transposition hash table, and a double deletion hash table and accumulating matches.

10. The method of claim 2, further comprising the steps of generating all adjacent character transpositions of said at least one candidate word and testing said adjacent character transpositions against transposition and deletion hash tables, and accumulating matches.

11. The method of claim 2, further comprising the steps of generating all single character deletions of said at least one candidate word and testing said single character deletions against transposition and deletion hash tables, and accumulating matches.

12. The method of claim 2, further comprising the steps of generating all single character replacements of said at least one candidate word and testing said single character replacements against a transposition-replacement, deletion-replacement, and insertion-replacement hash tables, and accumulating matches.

13. The method of claim 2, further comprising the steps of generating two character deletions of said at least one candidate word and testing said two character deletions against a double deletion hash table, and accumulating matches.

14. The method as recited in claim 2, further comprising a step of generating arbitrary character transpositions of said at least one candidate word by generating all variants of the candidate word wherein any one pair of not necessarily adjacent characters are interchanged, and the remaining characters are left unchanged.

15. The method of claim 2, further comprising the steps of generating all not necessarily adjacent character transpositions of said at least one candidate word and testing said not necessarily adjacent character transpositions against the transposition hash table and a deletion hash tables, and accumulating matches.

16. A system for correcting spelling of at least one candidate word, said system comprising:
a memory; and
at least one hardware processor, coupled to the memory, operative to:
obtain at least one variant dictionary hash table based on variants of a set of known correctly spelled words, wherein said variants are obtained by applying one or more of a deletion, insertion, replacement, and transposition operation on said correctly spelled words, wherein said variants obtained by applying one or more of an insertion and replacement operation on said correctly spelled words comprise a wildcard character, wherein for a given correctly spelled word having a length W, said at least one variant dictionary hash table comprises W of said variants each comprising said wildcard character in a different position, and wherein said variants are stored in said at least one variant dictionary hash table and are mapped to one of said corresponding correctly spelled words from said set of known correctly spelled words which are stored in a dictionary hash table that is distinct from said at least one variant dictionary hash table;
perform one or more of a deletion, insertion, replacement, and transposition operation on the at least one candidate word to obtain one or more lookup variants, wherein said lookup variants obtained by applying one or more of an insertion and replacement operation on said at least one candidate word comprise a wildcard character;
evaluate one or more of said lookup variants utilizing said at least one variant dictionary hash table to identify matches; and
indicate a candidate correction if said evaluation step indicates that there is at least one match in the at least one variant dictionary hash table.

17. An article of manufacture for correcting spelling of at least one candidate word, comprising a non-transitory computer readable medium containing one or more programs which when executed implement the steps of:
obtaining at least one variant dictionary hash table based on variants of a set of known correctly spelled words, wherein said variants are obtained by applying one or more of a deletion, insertion, replacement, and transposition operation on said correctly spelled words, wherein said variants obtained by applying one or more of an insertion and replacement operation on said correctly spelled words comprise a wildcard character wherein for a given correctly spelled word having a length W, said at least one variant dictionary hash table comprises W of said variants each comprising said wildcard character in a different position, and, wherein said variants are stored in said at least one variant dictionary hash table and are mapped to one of said corresponding correctly spelled words from said set of known correctly spelled words which are stored in a dictionary hash table that is distinct from said at least one variant dictionary hash table;
performing one or more of a deletion, insertion, replacement, and transposition operation on the at least one candidate word to obtain one or more lookup variants, wherein said lookup variants obtained by applying one or more of an insertion and replacement operation on said at least one candidate word comprise a wildcard character;
evaluating one or more of said lookup variants utilizing said at least one variant dictionary hash table to identify matches; and
indicating a candidate correction if said evaluation step indicates that there is at least one match in the at least one variant dictionary hash table.

18. The system of claim 16, wherein said dictionary hash table is pre-created prior to obtaining said candidate word, further comprising the step of obtaining said dictionary hash table having entries in a dictionary or known correctly spelled words and wherein said dictionary hash table and said at least one variant dictionary hash table are based on said dictionary and are comprised of at least one distance one variation for each of said entries, wherein said distance one variation comprises one or more of a deletion, insertion, replacement, and transposition operation performed on said entries; and
wherein the step of evaluating said lookup variants utilizing said at least one variant dictionary hash table further comprises the step of evaluating one or more distance one variants utilizing said at least one variant dictionary hash table.

19. The system of claim 18, wherein said distance one variation comprises a replacement operation to generate a replacement hash table having entries of single character wild card replacements of said entries in said dictionary and said method further comprises the steps of generating single character replacements and insertions of said candidate word and comparing said single character replacements and insertions against said replacement hash table.

20. The system of claim 19, wherein the replacement hash table is obtained by:
  generating variants of each word in the dictionary, each variant is comprised of replacing any one character in the word with a wild card character and leaving other characters unchanged, thereby generating W variants for each word of length W; and
  for each generated variant of a word in the dictionary, storing a key-value pair in a hash table, wherein a key is a generated variant having a value that is the word itself.

21. The system of claim 18, further comprising the steps of generating one or more distance one variants of said at least one candidate word and testing said distance one variants against one or more of said dictionary hash table and said at least one variant dictionary hash table, and accumulating matches.

22. The system of claim 18, further comprising the steps of generating all adjacent character transpositions of said at least one candidate word and testing said adjacent character transpositions against transposition and deletion hash tables, and accumulating matches.

23. The system of claim 18, further comprising the steps of generating all single character deletions and replacements of said at least one candidate word and testing said single character deletions and replacements against transposition, transposition-replacement, deletion-replacement, insertion-replacement and deletion hash tables, and accumulating matches.

24. The system of claim 18, further comprising the steps of generating two character deletions of said at least one candidate word and testing said two character deletions against a double deletion hash table, and accumulating matches.

* * * * *